US012478591B2

(12) United States Patent
Xu et al.

(10) Patent No.: US 12,478,591 B2
(45) Date of Patent: Nov. 25, 2025

(54) DIETARY SUPPLEMENT

(71) Applicants: Li Lian Xu, Valley Stream, NY (US); Li Su, Somerville, MA (US)

(72) Inventors: Li Lian Xu, Valley Stream, NY (US); Li Su, Somerville, MA (US)

(*) Notice: Subject to any disclaimer, the term of this patent is extended or adjusted under 35 U.S.C. 154(b) by 414 days.

(21) Appl. No.: 17/772,699

(22) PCT Filed: Nov. 25, 2020

(86) PCT No.: PCT/US2020/062196
§ 371 (c)(1),
(2) Date: Apr. 28, 2022

(87) PCT Pub. No.: WO2021/108527
PCT Pub. Date: Jun. 3, 2021

(65) Prior Publication Data
US 2022/0395473 A1    Dec. 15, 2022

Related U.S. Application Data

(60) Provisional application No. 62/939,861, filed on Nov. 25, 2019.

(51) Int. Cl.
| | | |
|---|---|---|
| A61K 31/07 | (2006.01) | |
| A23L 33/155 | (2016.01) | |
| A23L 33/16 | (2016.01) | |
| A23L 33/175 | (2016.01) | |
| A61K 31/045 | (2006.01) | |
| A61K 31/198 | (2006.01) | |
| A61K 31/405 | (2006.01) | |
| A61K 31/4172 | (2006.01) | |
| A61K 31/4415 | (2006.01) | |
| A61K 31/455 | (2006.01) | |
| A61K 31/51 | (2006.01) | |
| A61K 31/519 | (2006.01) | |
| A61K 31/525 | (2006.01) | |
| A61K 31/706 | (2006.01) | |
| A61K 31/714 | (2006.01) | |
| A61K 33/06 | (2006.01) | |
| A61K 33/26 | (2006.01) | |
| A61K 33/30 | (2006.01) | |
| A61K 33/32 | (2006.01) | |
| A61K 33/34 | (2006.01) | |
| A61K 36/54 | (2006.01) | |

(52) U.S. Cl.
CPC ............ *A61K 31/07* (2013.01); *A23L 33/155* (2016.08); *A23L 33/16* (2016.08); *A23L 33/175* (2016.08); *A61K 31/045* (2013.01); *A61K 31/198* (2013.01); *A61K 31/405* (2013.01); *A61K 31/4172* (2013.01); *A61K 31/4415* (2013.01); *A61K 31/455* (2013.01); *A61K 31/51* (2013.01); *A61K 31/519* (2013.01); *A61K 31/525* (2013.01); *A61K 31/706* (2013.01); *A61K 31/714* (2013.01); *A61K 33/06* (2013.01); *A61K 33/26* (2013.01); *A61K 33/30* (2013.01); *A61K 33/32* (2013.01); *A61K 33/34* (2013.01); *A61K 36/54* (2013.01); *A23V 2002/00* (2013.01)

(58) Field of Classification Search
None
See application file for complete search history.

(56) References Cited

U.S. PATENT DOCUMENTS

| | | | | |
|---|---|---|---|---|
| 7,115,285 | B2* | 10/2006 | McKee | A61K 31/522 |
| | | | | 514/263.34 |
| 2001/0036468 | A1* | 11/2001 | Han | A61K 33/34 |
| | | | | 424/630 |
| 2006/0115556 | A1 | 6/2006 | Foulger | |
| 2007/0065456 | A1* | 3/2007 | Woods | A61K 38/4873 |
| | | | | 514/6.9 |
| 2007/0141170 | A1* | 6/2007 | Lang | A61K 31/015 |
| | | | | 514/474 |
| 2007/0190209 | A1* | 8/2007 | Sinnott | A23L 33/15 |
| | | | | 426/72 |
| 2009/0018072 | A1* | 1/2009 | Scheele | A61P 43/00 |
| | | | | 426/656 |
| 2013/0011377 | A1 | 1/2013 | Perrin | |
| 2013/0230592 | A1* | 9/2013 | Terreaux | A61K 45/06 |
| | | | | 424/769 |
| 2014/0017312 | A1 | 1/2014 | Bubnis | |

(Continued)

FOREIGN PATENT DOCUMENTS

| | | |
|---|---|---|
| CN | 111838679 A | 10/2020 |
| WO | 0135765 A2 | 5/2001 |

OTHER PUBLICATIONS

International preliminary report on patentability for PCT/US2020/062196 issued May 17, 2022. p. 5.
International Search report for application PCT/US20/62196, issued Feb. 25, 2021, 29 pgs.
Nicotinamide mononucleotide; wikipedia article retrieved from "https://en.wikipedia.org/w/index.php?title=Nicotinamide_mononucleotide&oldid=926151227", Nov. 14, 2019, 2 pg.
Abstract of Chinese patent application CN111838679A, 1 pg.

*Primary Examiner* — Danah Al-Awadi
(74) *Attorney, Agent, or Firm* — Jason Plotkin

(57) ABSTRACT

The disclosed invention relates to a chemical composition that can be taken orally and supplements an unhealthy diet and lifestyle. In one aspect of the invention the chemical composition includes Retinol Palmitate, Thiamine, Riboflavin, Niacin, Nicotinamide mononucleotide (NMN), Pyridoxal, Folic Acid, Cyanocobalamin, Cholecalciferol, Zinc, Manganese, Copper, Calcium, Magnesium, Iron, L-Selenomethionine, Lysine, Phenylalanine, L-Threonine, L-Methionine, L-Histidine, L-Tryptophan, L-Leucine, L-Isoleucine, L-Valine, Cinnamon Bark Powder, and Curcumin.

19 Claims, No Drawings

(56) References Cited

U.S. PATENT DOCUMENTS

| | | | | |
|---|---|---|---|---|
| 2014/0271983 A1* | 9/2014 | Fernandez | ........... | A61K 31/215 426/2 |
| 2016/0199337 A1* | 7/2016 | Morris | ................... | A61K 33/26 514/168 |
| 2016/0235822 A1* | 8/2016 | Holstein | ............ | A61K 31/4415 |
| 2018/0296597 A1* | 10/2018 | Gharagozloo | ......... | A61K 31/01 |
| 2019/0021385 A1* | 1/2019 | Fernandez | .............. | A23L 33/16 |
| 2020/0215011 A1* | 7/2020 | Calton | .................... | A61P 21/00 |
| 2020/0222351 A1* | 7/2020 | Dhamane | ............. | A61K 31/192 |
| 2021/0205356 A1* | 7/2021 | Hider | ...................... | A23L 33/12 |

\* cited by examiner

DIETARY SUPPLEMENT

CROSS REFERENCE OF RELATED APPLICATIONS

The present application is related to and claims priority to U.S. Provisional Patent application, entitled "Dietary Supplement" which was filed on Nov. 25, 2019 and assigned Ser. No. 62/939,861. The U.S. Provisional Patent Application 62/939,861 is hereby incorporated by reference in its entirety.

FIELD OF INVENTION

This disclosure relates to a chemical composition for a nutritional supplement.

BACKGROUND

The present chemical composition contains multiple vitamins, minerals, amino acids, curcumin, and cinnamon. This unique formula is inspired by traditional Chinese medicine (TCM) to improve a person's health. Health is influenced by many factors including their environment, resting habits, diet etc. Diets that are heavy in certain foods such as alcohol, sugar, processed foods or restrictive diets such as vegan, ketogenic etc. may be imbalanced or incomplete from a TCM perspective.

This leads to a deficiency in vitamins, amino acids and various minerals that are important for maintaining normal human physiological functions. These nutrients, which cannot be synthesized by the body in a sufficient amount or at all, must be obtained from food. These nutrients play an important role in the growth, metabolism, and development of the human body. Since the required amount of these essential nutrients cannot be completely synthesized by the body, if they are insufficiently supplemented from external sources, the body will appear in various unhealthy states.

Supplements should also provide a comprehensive array of vitamins and minerals. The body needs comprehensive array of nutrients because many are used at the same time and serve to complement or inhibit each other. This is similar to the concept of mutual growth and mutual restraint in TCM. The absence of one component can affect the body and may even cause harm. For example, vitamin D helps with the absorption of calcium in the body. Current products in the market are inconvenient because they only include a limited number of nutrients that require the user to take multiple supplements.

Accordingly, there is an interest in products that may improve the health of individuals that are in a less than healthy state such as, being frail or elderly, maintaining a vegan diet, constantly being sleep deprived, trying to lose weight by dieting, consistently drinking cold drinks, etc. There is a need for a nutritional supplement that matches up nutrients to improve their efficacy and reduce their adverse effects.

SUMMARY

The disclosed invention relates to a chemical composition that can be taken orally. The chemical composition is a multi-vitamin and mineral supplement which supplies nutrients necessary to improve health and prevent diseases resulting from nutritional deficiencies and lifestyle factors.

In one aspect, the chemical composition can include Retinol Palmitate, Thiamine, Riboflavin, Niacin, Nicotinamide mononucleotide (NMN), Pyridoxal, Folic Acid, Cyanocobalamin, Cholecalciferol, Zinc, Manganese, Copper, Calcium, Magnesium, Iron, L-Selenomethionine, Lysine, Phenylalanine, L-Threonine, L-Methionine, L-Histidine, L-Tryptophan, L-Leucine, L-Isoleucine, L-Valine, Cinnamon Bark Powder, and Curcumin.

Additional advantages will be set forth in part in the description that follows, and in part will be obvious from the description, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

DETAILED DESCRIPTION

The disclosed invention relates to a chemical composition that can be ingested orally. As described below herein, the composition can be taken as a nutritional supplement to ameliorate a variety of condition including being frail or elderly, maintaining a vegan diet, constantly being sleep deprived, trying to lose weight by dieting, consistently drinking cold drinks, etc.

The composition may include a variety of components including: Retinol Palmitate, Thiamine, Riboflavin, Niacin, Nicotinamide mononucleotide (NMN), Pyridoxal, Folic Acid, Cyanocobalamin, Cholecalciferol, Zinc, Manganese, Copper, Calcium, Magnesium, Iron, L-Selenomethionine, Lysine, Phenylalanine, L-Threonine, L-Methionine, L-Histidine, L-Tryptophan, L-Leucine, L-Isoleucine, L-Valine, Cinnamon Bark Powder, and Curcumin.

Retinol Palmitate is a form of vitamin A. It is important for normal vision, and a healthy immune and reproductive system. It also helps with the healthy function of the heart, lungs, kidneys and other organs. An embodiment of the composition may include between 1 and 5 mg of Retinol Palmitate. Another embodiment of the composition may include 1 mg of Retinol Palmitate. Another embodiment of the composition may include 0.088% Retinol Palmitate by weight.

Thiamine is also known as vitamin B1. Thiamine is used by the body in the production of energy. It is important for the growth, development, and function of cells in the body. An embodiment of the composition may include between 50 and 250 mg of thiamin.

Another embodiment of the composition may include 50 mg of thiamin. Another embodiment of the composition may include between 4.387% and 4.394% Thiamine by weight.

Riboflavin is also known as vitamin B2. Riboflavin is used by the body in the production of energy. It is important for the growth, development, and function of cells in the body. An embodiment of the composition may include between 10 and 50 mg of Riboflavin. Another embodiment of the composition may include 10 mg of Riboflavin. Another embodiment of the composition may include between 0.879% and 1.053% Riboflavin by weight.

Niacin is a form of vitamin B3. Niacin is used by the body in the production of energy. It is important for the growth, development, and function of cells in the body. An embodiment of the composition may include between 10 and 50 mg of Niacin. Another embodiment of the composition may include 10 mg of Niacin. Another embodiment of the composition may include between 0.877% and 0.879% Niacin by weight.

Nicotinamide mononucleotide (NMN) is made from B vitamins and is used in metabolic processes. NMN is a promising molecule that may ameliorate some age related disorders. An embodiment of the composition may include between 25 and 125 mg of NMN. Another embodiment of the composition may include 25 mg of NMN. Another embodiment of the composition may include between 2.193% and 2.197% NMN by weight.

Pyridoxal is a form of vitamin B6. It is used in multiple enzymes related to metabolism. It is also involved in brain development during pregnancy and infancy and immune function. An embodiment of the composition may include between 1.5 and 7.5 mg of Pyridoxal. Another embodiment of the composition may include 1.5 mg of Pyridoxal. Another embodiment of the composition may include about 0.132% Pyridoxal by weight.

Folic Acid is also known as vitamin B9. Folic acid is necessary for the body to produce DNA and other genetic material. It is also necessary to help cells divide. An embodiment of the composition may include between 0.2 and 1.0 mg of Folic Acid. Another embodiment of the composition may include 0.2 mg of Folic Acid. Another embodiment of the composition may include about 0.018% Folic Acid by weight.

Cyanocobalamin is a form vitamin B12. It is used to keep the body's nerve and blood cells healthy and is used in the production of DNA. Cyanocobalamin also helps prevent a type of anemia. An embodiment of the composition may include between 0.1 and 0.5 mg of Cyanocobalamin. Another embodiment of the composition may include 0.1 mg of Cyanocobalamin. Another embodiment of the composition may include about 0.009% Cyanocobalamin by weight.

Cholecalciferol is a form of vitamin D. It is needed for health and to maintain strong bones. It helps the body absorb Calcium. It is also needed for healthy muscles, nerves, and immune system. An embodiment of the composition may include between 0.01 and 0.05 mg of Cholecalciferol. Another embodiment of the composition may include 0.01 mg of Cholecalciferol. Another embodiment of the composition may include about 0.001% Cholecalciferol by weight.

Zinc is a mineral necessary for health. Zinc helps the immune system. The body needs zinc to produce proteins and DNA. Zinc is necessary for healthy development of children during pregnancy, infancy and childhood. It can also help heal wounds. An embodiment of the composition may include between 20 and 100 mg of Zinc. Another embodiment of the composition may include 20 mg of Zinc. Another embodiment of the composition may include between 1.755% and 1.758% Zinc by weight.

Manganese is a mineral required for health. The body uses manganese to produce energy and as an antioxidant. Manganese is necessary for healthy bones, a healthy reproduction system, a healthy immune system and blood clotting. An embodiment of the composition may include between 0.5 and 2.5 mg of Manganese. Another embodiment of the composition may include 0.5 mg of Manganese. Another embodiment of the composition may include about 0.044% Manganese by weight.

Copper is a mineral necessary for health. Copper is used in several bodily functions including producing energy, blood vessels and connective tissues. It is also necessary for a healthy immune system, brain development and DNA. An embodiment of the composition may include between 0.5 and 2.5 mg of Copper. Another embodiment of the composition may include 0.5 mg of Copper. Another embodiment of the composition may include about 0.044% Copper by weight.

Calcium is a mineral required for health. The body uses calcium to build strong bones and teeth. Calcium is also needed for the healthy function of muscles, nerves and blood vessels. An embodiment of the composition may include between 50 and 250 mg of Calcium. Another embodiment of the composition may include 50 mg of Calcium.

Another embodiment of the composition may include between 4.387% and 4.394% Calcium by weight.

Magnesium is a mineral necessary for health. Magnesium is used for regulating different processes in the body including regulating muscles, nerves, blood sugar, blood pressure and the production of proteins. An embodiment of the composition may include between 10 and 50 mg of Magnesium. Another embodiment of the composition may include 10 mg of Magnesium. Another embodiment of the composition may include between 0.877% and 0.879% Magnesium by weight.

Iron is a mineral required for health. Iron is a necessary part of hemoglobin and myoglobin, both are proteins used to transport oxygen throughout the body. Iron is also used to make some hormones. An embodiment of the composition may include between 9 and 45 mg of Iron. Another embodiment of the composition may include 9 mg of Iron. Another embodiment of the composition may include between 0.790% and 0.791% Iron by weight.

L-Selenomethionine is an amino acid and is the main form of selenium in many types of foods. Selenium is important for reproductive health, thyroid function and DNA production. It is also an antioxidant. An embodiment of the composition may include between 0.01 and 0.05 mg of L-Selenomethionine. Another embodiment of the composition may include 0.01 mg of L-Selenomethionine. Another embodiment of the composition may include about 0.001% L-Selenomethionine by weight.

Lysine is an amino acid. Lysine is important component to the body's production of DNA and proteins. It also assists with the absorption of necessary minerals. An embodiment of the composition may include between 100 and 500 mg of Lysine.

Another embodiment of the composition may include 100 mg of Lysine. Another embodiment of the composition may include between 8.773% and 8.789% Lysine by weight.

Phenylalanine is an essential amino acid. Phenylalanine may reduce pain and act as an antidepressant. An embodiment of the composition may include between 100 and 500 mg of Phenylalanine. Another embodiment of the composition may include 100 mg of Phenylalanine. Another embodiment of the composition may include between 8.773% and 8.789% Phenylalanine by weight.

L-Threonine is an essential amino acid. L-Threonine is taken in response to several different muscle diseases including multiple sclerosis (MS) and amyotrophic lateral sclerosis (ALS). An embodiment of the composition may include between 100 and 500 mg of L-Threonine. Another embodiment of the composition may include 100 mg of L-Threonine. Another embodiment of the composition may include between 8.773% and 8.789% L-Threonine by weight.

L-Methionine is an essential amino acid. L-Methionine is an important component for the growth of new blood vessels and the production of some proteins. An embodiment of the composition may include between 50 and 250 mg of L-Methionine. Another embodiment of the composition may include 50 mg of L-Methionine. Another embodiment of the composition may include between 4.387% and 4.394% L-Methionine by weight.

L-Histidine is an amino acid. It is used in the production of proteins. L-histidine is taken by some for cholera, rheumatoid arthritis, allergies, ulcers and anemia. An embodiment of the composition may include between 50 and 250 mg of L-Histidine. Another embodiment of the composition may include 50 mg of L-Histidine. Another embodiment of the composition may include between 4.387% and 4.394% L-Histidine by weight.

L-Tryptophan is an amino acid. It is used in the production of proteins and certain neurotransmitters. L-Tryptophan is taken by some for loss of sleep, depression and mood swings. An embodiment of the composition may include between 50 and 250 mg of L-Tryptophan. Another embodiment of the composition may include 50 mg of L-Tryptophan. Another embodiment of the composition may include between 4.387% and 4.394% L-Tryptophan by weight.

L-Leucine is an essential amino acid. L-leucine is taken by some to increase the production of muscle protein synthesis. An embodiment of the composition may include between 100 and 500 mg of L-Leucine. Another embodiment of the composition may include 100 mg of L-Leucine. Another embodiment of the composition may include between 8.773% and 8.789% L-Leucine by weight.

L-Isoleucine is an amino acid. L-Isoleucine is taken by some to increase the production of muscle protein synthesis. An embodiment of the composition may include between 100 and 500 mg of L-Isoleucine. Another embodiment of the composition may include 100 mg of L-Isoleucine. Another embodiment of the composition may include between 8.773% and 8.789% L-Isoleucine by weight.

L-Valine is an amino acid. L-Valine is taken by some to increase the production of muscle protein synthesis. An embodiment of the composition may include between 100 and 500 mg of L-Valine. Another embodiment of the composition may include 100 mg of L-Valine. Another embodiment of the composition may include between 8.773% and 8.789% L-Valine by weight.

Cinnamon Bark Powder is a spice. Cinnamon is taken by some to regulate blood sugar and cholesterol levels. An embodiment of the composition may include between 100 and 500 mg of Cinnamon Bark Powder. Another embodiment of the composition may include 100 mg of Cinnamon Bark Powder. Another embodiment of the composition may include between 8.773% and 8.789% Cinnamon Bark Powder by weight.

Curcumin is a spice and is the principal curcuminoid of turmeric. Turmeric is taken by some to ameliorate the effects of some bone diseases. An embodiment of the composition may include between 100 and 500 mg of Curcumin. Another embodiment of the composition may include 100 mg of Curcumin. Another embodiment of the composition may include between 8.773% and 8.789% Curcumin by weight.

Compositions for oral administration include powders or granules, suspensions or solutions in water or non-aqueous media, capsules, sachets, gummies, or tablets. Thickeners, flavorings, diluents, emulsifiers, dispersing aids or binders may be desirable.

The illustrations and embodiments disclosed herein are exemplary and do not limit the spirit and scope of the disclosed system and composition. Combinations of one or more disclosed embodiments or portions of one or more embodiments are contemplated as being within the scope of the disclosed system and composition.

What is claimed is:

1. A composition consisting of:
   Retinol Palmitate, Thiamine, Riboflavin, Niacin, Nicotinamide mononucleotide (NMN), Pyridoxal, Folic Acid, Cyanocobalamin, Cholecalciferol, Zinc, Manganese, Copper, Calcium, Magnesium, between 26 mg and 45 mg of Iron, greater than or equal to 0.01 mg and less than 0.02 mg of L-Selenomethionine, Lysine, Phenylalanine, L-Threonine, between 50 and 250 mg of L-Methionine, L-Histidine, L-Tryptophan, L-Leucine, L-Isoleucine, L-Valine, and Cinnamon Bark Powder.

2. The composition of claim 1 wherein, NMN is between 2.193% and 2.197% of the composition by weight.

3. The composition of claim 1 wherein, Zinc is between 1.755% and 1.758% of the composition by weight.

4. The composition of claim 1 wherein, Manganese is approximately 0.044% of the composition by weight.

5. The composition of claim 1 wherein, Copper is approximately 0.044% of the composition by weight.

6. The composition of claim 1 wherein, Calcium is approximately 4.394% of the composition by weight.

7. The composition of claim 1 wherein, Magnesium is between 0.877% and 0.879% of the composition by weight.

8. The composition of claim 1 wherein, L-Selenomethionine is approximately 0.001% of the composition by weight.

9. The composition of claim 1 wherein, Lysine is between 8.773% and 8.789% of the composition by weight.

10. The composition of claim 1 wherein, Phenylalanine is between 8.773% and 8.789% of the composition by weight.

11. The composition of claim 1 wherein, L-Threonine is between 8.773% and 8.789% of the composition by weight.

12. The composition of claim 1 wherein, L-Methionine is between 4.387% and 4.394% of the composition by weight.

13. The composition of claim 1 wherein, L-Histidine is between 4.387% and 4.394% of the composition by weight.

14. The composition of claim 1 wherein, L-Tryptophan is between 4.387% and 4.394% of the composition by weight.

15. The composition of claim 1 wherein, L-Leucine is between 4.387% and 8.789% of the composition by weight.

16. The composition of claim 1 wherein, L-Isoleucine is between 8.773% and 8.789% of the composition by weight.

17. The composition of claim 1 wherein, L-Valine is between 8.773% and 8.789% of the composition by weight.

18. The composition of claim 1 wherein, Cinnamon Bark Powder is between 8.773% and 8.789% of the composition by weight.

19. The composition of claim 1 wherein, 25 mg of NMN is included.

* * * * *